May 8, 1962 I. S. LERNER ETAL 3,034,114

DATA TRANSLATING SYSTEMS

Filed Nov. 22, 1957 3 Sheets-Sheet 1

Fig. I

INVENTORS
IRWIN S. LERNER
ROBERT L. KISSNER
BY Thomas S. Ross
Joseph R. Spalla
ATTORNEYS INVENTORS
IRWIN S. LERNER
ROBERT L. KISSNER
BY Thomas S. Ross
Joseph F. Spalla
ATTORNEYS INVENTORS
IRWIN S. LERNER
ROBERT L. KISSNER
BY Thomas S. Ross
Joseph R. Spalla
ATTORNEYS United States Patent Office 3,034,114

Patented May 8, 1962

3,034,114

DATA TRANSLATING SYSTEMS

Irwin S. Lerner, Attleboro Falls, Mass., and Robert L. Kissner, Trailsend, Conn., assignors to Royal McBee Corporation, Port Chester, N.Y., a corporation of New York Filed Nov. 22, 1957, Ser. No. 698,083
1 Claim. (Cl. 340—347)

This invention relates to data translating systems of the type in which information is translated into data processing machine language; more particularly it relates to a system wherein information is encoded and thereafter transferred on command to utilization circuits; more specifically it relates to a data translating system wherein signals initiated in response to depression of printing machine keys are coded and temporarily stored in binary form in magnetic cores and subsequently read out of said cores thereby to effect selection of punch set up mechanisms whereby the coded signals may be punched in conventional 5, 6, 7 or 8 channel communication coded tapes.

Due to the complexity and size of data processing equipment it is generally desirable to provide a construction employing a minimum of components and to utilize miniature components whereby compact constructions are made possible. At the same time it is also advantageous to reduce the power required by and to increase the speed of operation of data processing units without any sacrifice of dependability.

In the instant invention the above mentioned desirable features are realized through employment of ferrite cores of the type which exhibit rectangular B–H characteristics in combination with transistors. The cores are miniature in size, dependable, operate with low levels of power, and have the ability to retain stored information in binary form. In accordance with the invention a plurality of these bistable cores are employed, each core representing a successive binary order. A plurality of input or write lines, each of which represents a piece of information which is to be coded and only one of which is energized at a given time, are selectively strung through appropriate ones of the cores in accordance with a predetermined coding arrangement. A readout line is strung through all of said cores and each of said cores is strung with an output line. All of the cores are initially set to one of their stable states. When a given input line is energized by a write signal those cores through which it is strung will change to their other stable states thereby inducing voltages in the output windings thereof. Transistor amplifiers connected to the output windings however, are biased such that the voltages induced in the output windings due to changes from the initial state are not amplified. Upon the energization of the readout line those cores which changed state are switched back to their initial state and the signal voltages induced in the output windings of the cores restored to initial states are of such sign that they are amplified.

Further in accordance with the invention the read signals are initiated in a control circuit responsive to the write signals which are simultaneously applied thereto. Upon receipt of a write signal the control circuit energizes an electromagnet in a tape feed mechanism and a function control electromagnet which permits the rotation of a shaft which powers the tape feed mechanism and a punch mechanism. Means responsive to predetermined angular degrees of rotation of the shaft are adapted to successively deenergize the function control electromagnet whereby the shaft is prevented from rotating more than 360°, energize the readout line through all the cores, deenergize the tape feed electromagnet, and to deenergize punch selecting electromagnets selectively energized by the signals induced in the output lines of the cores restored to their initial state by a read signal.

It is an object of the invention therefore to provide a system adapted to convert information into data processing machine language.

Another object of the invention is to provide a system adapted to code and store information and to transfer the stored information to utilization circuits.

A further object of the invention is the provision of a simple information converting and storage system employing bistable magnetic cores.

Still another object of the invention is to provide a system for encoding and storing data in bistable magnetic cores wherein the data stored in the cores by a write signal is caused to be read out by a signal initiated by circuitry responsive to the write signal.

Other objects and many of the attendant advantages of this invention will be readily appreciated as the same becomes better understood by reference to the following detailed description when considered in connection with the accompanying drawings in which like reference numerals designate like parts throughout the figures thereof and wherein.

Figure 1:
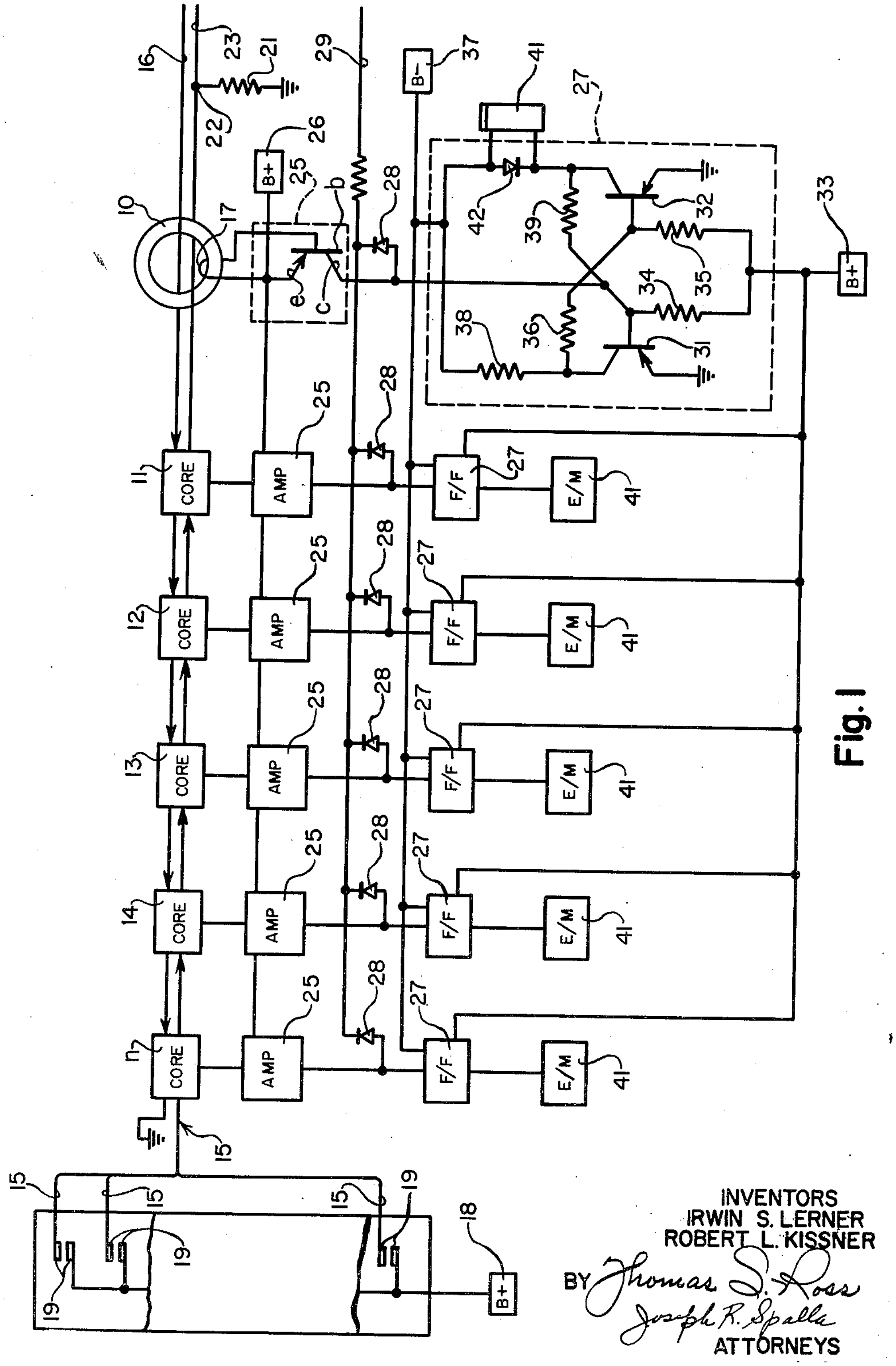
FIGS. 1 and 2 show a partially schematic block diagram of the data translating system in accordance with the invention.
Figure 3:
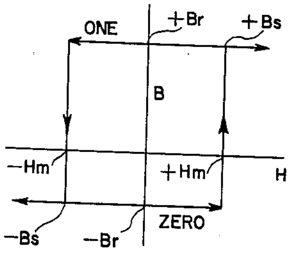
FIG. 3 shows an idealized hysteresis curve for the magnetic elements employed by the invention.

Referring now to the drawings wherein like reference numerals designate like or corresponding parts throughout the several views there is shown in FIG. 1 a plurality of toroidal ferrite core elements 10, 11, 12, 13, 14 . . . *n*. These ferrite cores as is understood in the art are specially treated to provide a rectangular hysteresis loop as illustrated in FIG. 3 whereby the cores will operate as bistable elements. As is understood the hysteresis effect is due to the phenomena that if a magnetizing force $H_m$ is applied to a core, which previously has been completely demagnetized, and the magnetizing force is then removed the core will not return to its demagnetized state but will retain a certain amount of residual magnetism. This amount is called the residual flux density $B_r$ and in ferrite cores is substantially equivalent to the magnitude of the saturation flux density $B_s$ set up in the core by the magnetizing force $H_m$. In FIG. 3 points $+B_r$ and $-B_r$ represent the residual flux density in a core after removal of positive and negative magnetizing forces $+H_m$ and $-H_m$ respectively. Arbitrarily assigning the positive residual state as binary one and the negative residual state as binary zero it may be seen that when a core is in the "zero" state, a magnetizing force of $+H_m$ impressed on the core will switch it to the "one" state. Similarly when a core is in a "one" state and a magnetizing force $-H_m$ is impressed on the core it will switch to its "zero" state. A magnetizing force of $-H_m$ when the core is in its "zero" state or a magnetizing force of $+H_m$ when the core is in its "one" state will not switch a core but will only drive it to saturation points $+B_s$ and $-B_s$ respectively.

Each of the ferrite core elements, 10, 11, 2, 13, 14 . . . *n* represent successive binary orders i.e. $2^0$ . . . $2^n$; the number of orders depending on the number of character, numeral and control functions to be translated into data processing machine language. A plurality of input or write lines, generally designated by reference numeral 15, only one of which is energized at a given time, are selectively strung through the cores in accordance with a predetermined coding arrangement. It is understood that the state of the cores will depend on the direction of the magnetizing force last impressed on the cores. Since the $+B_r$ state has been arbitrarily assigned binary one, the input or write lines are strung through the cores such that when a line 15 is energized, a magnetizing force $H_m$ of sufficient magnitude will be set up in those cores through which it is strung which will switch those cores to their one states. A readout line 16 is also strung through all the cores such that when energized the magnetizing force will be in a direction to switch cores in the one state back to the zero state. Each of the cores is also provided with an output winding 17. With the cores so set up it may be seen that a multiplicity of variables may be represented by a minimum of variables in coded form. For example, assuming six cores representing six binary orders, up to 64 pieces of information may be coded wherein the character A would be represented by 000001, B by 000010, C by 000011 etc.

In accordance with the invention the input or write lines 15 are individually energized upon connection to a positive voltage supply 18 when associated switch contacts 19 are closed in response to the actuation of a typing mechanism such as a type bar in a printing machine. It is to be understood however, that the input or write lines may be energized from any suitable means such as from the output of a computer. A line energized upon actuation of a type bar will switch the core or cores through which it is strung from a zero state to a one state. As an example, the line energized by actuation of an A type bar would be strung only through core 10 representing the 2° order, the line energized upon actuation of the B type bar would be strung only through core 11 representing the 2′ order, the line energized upon actuation of the C type bar would be strung only through cores 10 and 11 representing the 2° and 2′ orders, etc.

All of the input or write lines are connected to ground through a common resistor 21; and the common junction 22 of the write lines is connected over a conductor 23 to a control circuit, generally designated by reference numeral 24 (FIG. 2), wherein, as will more fully appear hereinafter, means for powering a tape feed and punching mechanism is set in motion and wherein means responsive to said motion causes the energization of the readout line 16.

The output windings 17 of the cores are each connected between the emitter *e* and the base *b* of a common emitter PNP junction transistor amplifier 25 designed for class B operation. The emitters of all the amplifiers are connected to a positive voltage supply 26 as shown in FIG. 1. The collectors *c* are each connected as will hereinafter appear, to a negative potential point in a PNP common emitter junction transistor flip flop circuit 27 and to the anode of a diode 28 whose cathode is connected over conductor 29 to the control circuit 24. The flip flop circuits 27 each comprise a transistor 31 and transistor 32. The emitters of each are connected to ground; the bases of each are connected to a positive voltage supply 33 through resistors 34 and 35 respectively; the collector of transistor 31 in each flip flop circuit is connected to the base of its associated transistor 32 through a resistor 36 and to a negative voltage supply 37 through a resistor 38; and the collector of transistor 32 in each flip flop circuit is connected to the base of its associated transistor 31 through a resistor 39 and to the negative voltage supply 37 through a data punch selector electromagnet 41.

As will be understood by those skilled in the art the resistor values and positive supply potentials are chosen such that transistors 31 and 32 will have two stable states of operation.

An index or feed punch selector electromagnet may also be energized through a core, amplifier, and flip flop circuit whereby it would be energized simultaneously with one or more of the data punch selector electromagnets as is understood in the art. However, in order to reduce the number of ferrite cores and transistors, the index or feed punch selector electromagnet is connected in the control circuit 24; and although it is energized earlier than necessary as will hereinafter appear the cost of the power expended due to the earlier energization is negligible as compared to the cost of the additional core and transistors necessary to energize it simultaneously with the data punch selector electromagnets 41.

As is now apparent from FIG. 1 the negative point to which the collectors of amplifiers 25 are each connected is the base of normally conducting transistor 31. A diode 42 is connected in parallel with each of the data punch selecting electromagnets 41 and poled to protect transistors 32 in each of the flip flop circuits 27 by providing a current path for the current which results from the collapse of the electromagnet field.

Figure 2:
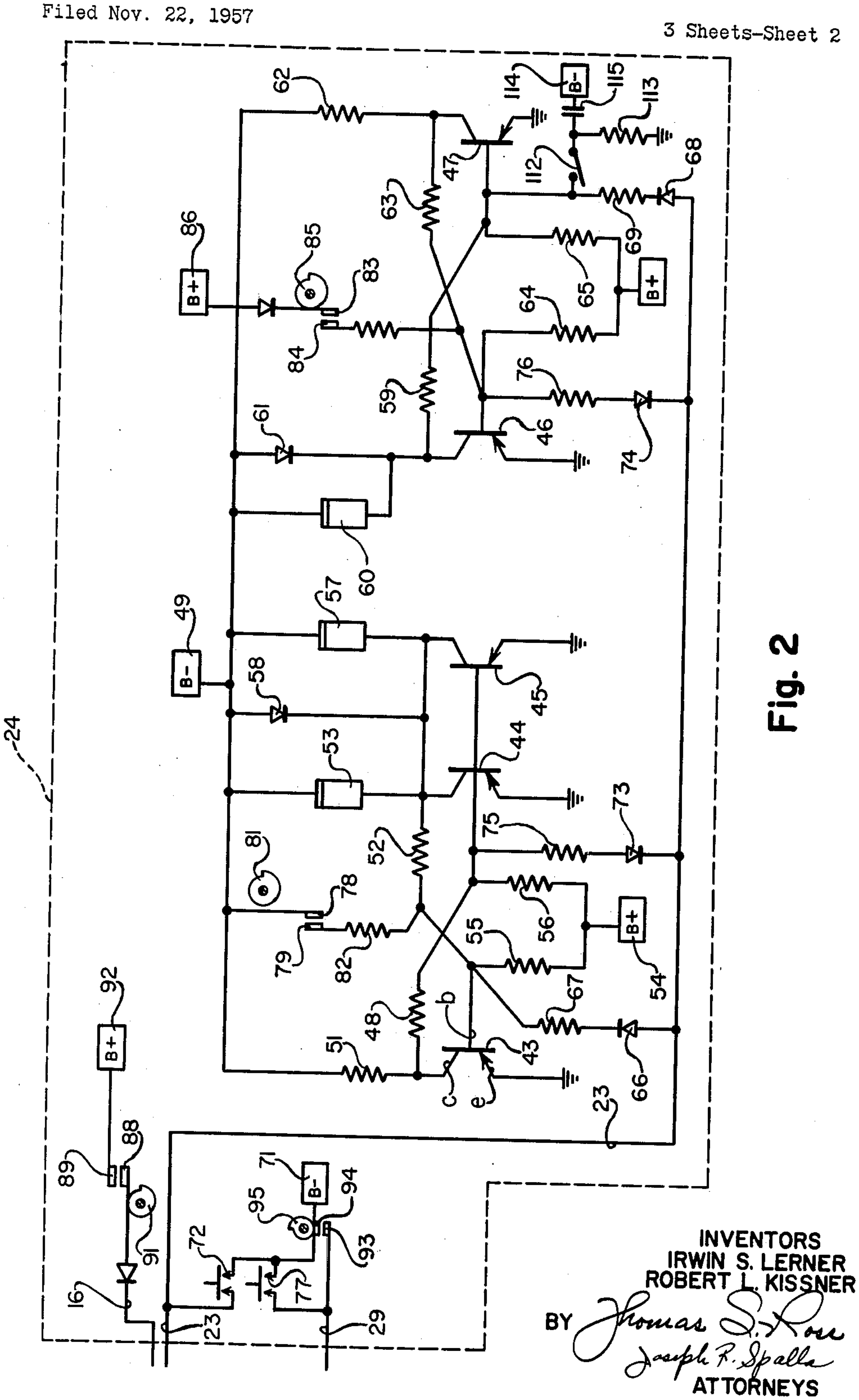

Referring now to FIG. 2 the control circuit comprises five common emitter PNP junction transistors 43, 44, 45, 46 and 47. The collector of transistor 43 is connected to the base of transistor 44 through resistor 48 and to a negative voltage supply 49 through resistor 51. The collector of transistor 44 is connected to the base of transistor 43 through a resistor 52 and to the negative voltage supply 49 through an index or feed punch selecting electromagnet 53. The bases of transistors 43 and 44 are connected to a positive voltage supply 54 through resistors 55 and 56 respectively. Transistor 45 is connected in parallel with transistor 44 and has its collector connected to the negative supply voltage 49 through a paper feed control electromagnet 57. As will be understood in the art the resistors in the circuit connections described are chosen such that transistors 43 and 44 will have two stable states of operation i.e. normally conducting and normally non-conducting. A protective diode 58 is also provided in parallel with electromagnets 53 and 57.

Transistors 46 and 47 are also connected to operate as a flip flop circuit. As shown the collector of transistor 46 is connected to the base of transistor 47 through resistor 59 and to the negative supply voltage 49 through a clutch control electromagnet 60 paralleled by a protective diode 61. The collector of transistor 47 is connected to the negative supply voltage 49 through resistor 62 and to the base of transistor 46 through resistor 63. The bases of transistors 46 and 47 are connected to a positive voltage supply through resistors 64 and 65 respectively. Again the resistor values in the circuit connections described are chosen such that transistors 46 and 47 will have two stable states of operation i.e. normally conducting and normally non-conducting.

Positive write signals from lines 15, after switching the cores through which they are selectively wound, are coupled via conductor 23 to the base of transistor 43 through a properly poled diode 66 in series with a current limiting resistor 67 and to the base of transistor 47 through a properly poled diode 68 in series with a current limiting resistor 69. Negative clear signals from a negative voltage supply 71, initiated in line 23 upon closure of a clear switch 72, are adapted to be applied to the bases of transistor 44 and 46 through properly poled diodes 73 and 74 in series with current limiting resistors 75 and 76 respectively. A second clear switch 77 ganged for operation with clear switch 72 is adapted to connect the negative voltage supply 71 to conductor 29.

A pair of normally open contacts 78 and 79 adapted to be closed by a paper feed and index punch electromagnet release cam 81 are connected respectively to the negative voltage supply 49 and to the base of transistor 43 through a resistor 82. Similarly a pair of normally open contacts 83 and 84 adapted to be closed by a clutch electromagnet release cam 85 are connected respectively to a positive voltage supply 86 and to the base of transistor 46 through a resistor 87. Another pair of contacts 88 and 89 adapted to be closed by a readout cam 91 are connected to the readout line 16 and to a positive voltage supply 92. A further pair of contacts 93 and 94 adapted to be closed by a data punch electromagnet release cam 95 are connected respectively to conductor 29 and to the negative supply voltage 71. As shown in FIG. 2 clear switch 77 is bypassed when contacts 93 and 94 are closed.

Figure 4:
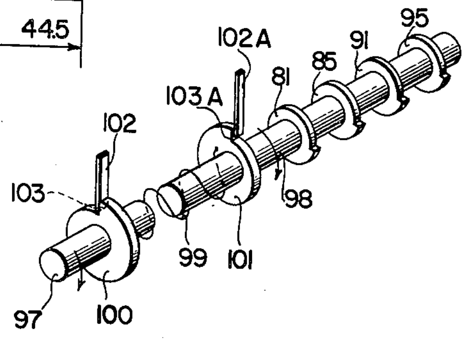
FIG. 4 is a diagrammatic perspective view of the control circuit timing mechanism.

Referring now to FIG. 4 there is shown a continuously driven shaft 97 and a shaft 98 adapted to carry cams 81, 85, 91 and 95. The cams are so mounted on shaft 98 as to close their associated contacts at predetermined times and in a predetermined sequence as will hereinafter be explained. The shafts 97 and 98 are adapted to be coupled by a wrap spring clutch well known in the art which comprises a helical spring 99 wrapped concentrically about both shafts with the ends thereof attached to clutch control disks 100 and 101 rotatably mounted on the shafts 97 and 98 respectively. The normal diametral dimension of the spring 99 is such that the shafts are coupled, with rotation of the shaft 97 serving to tighten the grip of the spring. The spring 99 is disengaged by relatively rotatably displacing the control disks 100 and 101 in a direction which will cause the diameter of the spring 99 to expand. The spring is held in the disengaged position by interponents 102, one of which (102A) comprises the armature of the clutch electromagnet 60, which cooperate with step notches 103 and 103A in the disks whereby relative rotation of the disks under the urging of the expanded spring is prevented. Energization of the clutch electromagnet 60 will pull its armature 102A out of engagement from its associated notch in disk 101 whereupon the spring will wrap and couple the shafts. If the clutch electromagnet 60 is thereafter deenergized its armature 102A will reengage the step notch 103A at the end of a 360° rotary cycle thereby causing the spring to unwrap and decouple the shafts.

The operation of the instant invention will now be described with reference to FIGS. 1, 2 and 4 and the timing diagram shown in FIG. 5.

In accordance with the invention flip flop transistors 31, 43 and 47 are normally in their stable conducting states and transistor 32, 44 and 45 and 46 are normally in their stable non-conducting states. Upon closure of switch contacts 19, only one pair of which is closed at a given time by a type bar, a current or write pulse 104 (FIG. 5) will flow in the line 15 associated therewith for a predetermined period of time which will change the state of those cores through which it is selectively strung from a zero to a one state. The voltages induced in the output windings 17 due to the changes of state from zero to one will be in a direction as to place a positive potential on the bases of associated transistor amplifiers 25 which therefore will not go into conduction. At this point information is coded and stored by the cores.

The positive write signal carried by conductor 23 is passed by diodes 66 and 68 connected to the bases of transistors 43 and 47. As a result transistors 43 and 47 will cut off and transistors 44, 45 and 46 will conduct. Upon conduction of transistors 44, 45 and 46 the paper feed 53, index punch selector 57 and clutch electromagnet 60 in their respective collector circuits will be energized. Curve 105 in FIG. 5 shows the current buildup vs. time of the clutch electromagnet 60 and curve 106 illustrates both the current buildup vs. time of the paper feed and the index punch selector electromagnets 53 and 57. As illustrated in curve 105, the current through the clutch electromagnet at time $t_1$ is of sufficient magnitude as to cause the armature 102A thereof to be pulled out of engagement from the clutch control disk 101 whereupon the spring wraps and couples the drive shaft 97, as heretofore explained with reference to FIG. 4, to the cam carrying shaft 98 thereby beginning a 360° cycle at time $t_2$. After a predetermined angular rotation (12°) the clutch release cam 85 closes its associated contacts 83 and 84 for a predetermined time interval corresponding to the shaft rotation between 12° and 36° as represented by curve 107. Closure of contacts 83 and 84 connects a positive potential 86 to the base of transistor 46 and as a result transistor 46 cuts off and transistor 47 conducts thereby deenergizing the clutch electromagnet 60 whereby its armature 102A will be enabled to reengage the clutch control disk 101 after the shaft 98 completes a 360° rotation. The readout cam 91 simultaneously closes its associated contacts 88 and 89 for a predetermined period of time also illustrated by curve 107 thereby connecting the positive supply potential 92 to the readout line 16. The current in the readout line 16 causes the cores which were switched to the one state by a write signal to switch back to a zero state. The voltages induced in the output windings 17 due to a change of state from one to zero are in a direction as to place a negative potential on the bases of associated amplifiers 25 which will therefore conduct; the voltages induced in the output windings 17 of those cores in the zero state by the magnetic field set up by the readout current being negligible. As is understood the common emitter transistor amplifier reverses the phase of the signals applied thereto thereby making the amplified output signal voltage positive. The positive voltage outputs of the amplifiers are carried as heretofore stated to the bases of the normally conducting transistors 31 in the flip flop circuits 27 thereby cutting them off and rendering transistors 32 conducting. Conduction of transistors 32 energizes the punch selecting electromagnets 41 in the collector circuits thereof and the current builds up therein as shown in curve 108 (FIG. 5). At some later predetermined angular rotation of the shaft the contacts 78 and 79 associated with the paper feed and index punch release cam 81 and the contacts 93 and 94 associated with the data punch selector release cams 95 are simultaneously closed for a predetermined period of time as illustrated by curve 109 (FIG. 5). Closure of contacts 78 and 79 connects the negative supply potential 49 to the base of transistor 43 in the control circuit and closure of contacts 93 and 94 connects the negative supply potential 71 through conductor 29 and diodes 28 to the bases of transistors 31 in the flip flop circuits 27. This sequence renders transistor 43 and transistors 31 conducting thereby deenergizing the electromagnets in the collector circuits of the now non-conducting transistors 44, 45 and 32 respectively.

Rotation of shaft 98 also powers a tape feed drive arm and a punch drive arm in a tape perforating mechanism disclosed and claimed in copending application Ser. No. 681,354 now Patent 2,997,321 filed August 30, 1957, of Guillermo Perez. The motion of the punch drive arm and the motion of the tape feed drive arm are shown by curves 110 and 111 respectively in FIG. 5. As disclosed in said co-pending application the motion of the tape feed drive arm in combination with the paper feed electromagnet 57 causes a pawl to engage a tape feed roll ratchet at a time corresponding to 90° rotation of shaft 98; said pawl rotating the feed roll over an interval corresponding to another 90° of rotation of shaft 98.

Also as disclosed in said copending application, when the punch drive arm has reached a position corresponding to 90° rotation of shaft 98, the current in the punch selector electromagnets 41 is built up sufficiently so as to effect, in combination with the motion of the punch drive arm, a coupling between the drive arm and punches in the perforating mechanism disclosed in said application when the drive arm reaches a position corresponding to 140° rotation of shaft 98. Thereafter as heretofore stated, the index punch 53, paper feed 57 and data punch electromagnets 41 are simultaneously deenergized and during the remainder of the cycle a tape is fed and selected punches perforate the tape during the intervals shown in FIG. 5.

Figure 5:
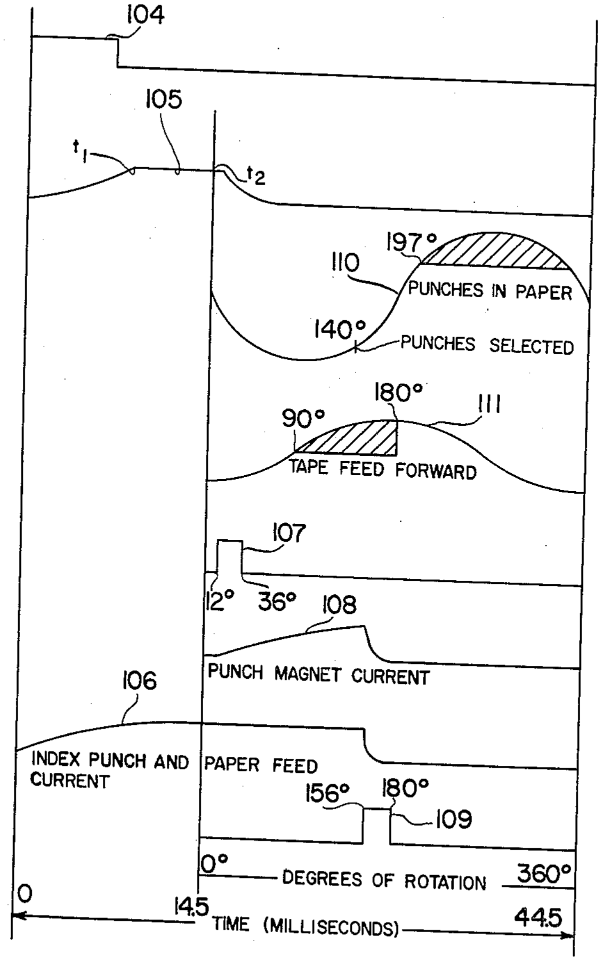
FIG. 5 is a timing diagram explanatory of the encoder operation.

As shown in FIG. 5 the time interval between closure of switch contacts 19 and the beginning of a cycle is only 14.5 and a cycle only 30 milliseconds. Inasmuch as 14 strokes a second or a stroke every 71.5 milliseconds is the maximum speed of operation of present day typewriters it is apparent that the instant invention is capable of converting information typed at maximum speeds into data processing machine language with time to spare. If faster operation were necessary the shaft could be speeded up still further to reduce the cycle time.

In the above explanation of operation it was assumed that the cores and flip flops were in a proper state. To assure that all the cores and flip flops are in a proper state prior to operation, the ganged clear switches 72 and 77 are depressed thereby connecting the negative supply voltage 71 to line 29 which connects the negative supply potential through diodes 28 to the bases of transistors 31 in the flip flop circuits assuring their conduction. The negative supply voltage 71 is also connected to line 23 through clear switch 72 and passed by diodes 73 and 74 to the bases of normally non-conducting transistors 44 and 46 thereby causing them to conduct and initiate a cycle of shaft 98 which as heretofore explained will send a readout current through all the cores assuring that they are in a zero state. If any of the cores were by chance in the one state, the positive signal output of the amplifiers 25 would be ineffective to cut transistors 31 off since the clear switch 77, which remains depressed for as long as clear switch 72, maintains a negative potential on the bases of the transistors 31. It will be seen also that as long as clear switches 72 and 77 remain depressed the shaft 98 will go through repeated cycles wherein the tape feed and the index punch selector electromagnets 57 and 53 will be cyclically energized and deenergized whereby prior to operation a tape may be provided with a sufficient number of feed holes to enable the tape to be threaded over a sprocketed feed spool as is understood in the art.

As seen in FIG. 2 the base of transistor 47 is connected to one terminal of a switch 112 whose other terminal is connected to ground through a resistor 113 and to a negative voltage supply 114 through condenser 115. The switch 112 is closed prior to turning on the main power switch whereby upon closure of the main power switch the conduction of transistor 47 is assured thereby preventing a cycle to begin before clearing the apparatus as described above.

It should be understood therefore, that the foregoing disclosure relates to only a preferred embodiment of the invention and that it is intended to cover all changes and modifications of the example of the invention herein chosen for the purposes of the disclosure, which do not constitute departures from the spirit and the scope of the invention.

The invention claimed is:

An encoder for converting X pieces of discrete signal information into combinations of Y signals where the relationship between X and Y is $X=2^Y$ comprising Y bistable magnetic cores each representing a binary order, said cores collectively representing a succession of binary orders, X conductors selectively strung through said cores in accordance with a predetermined binary coding arrangement, a plurality of means each representative of data to be converted operable one at a time to energize a discretely associated one of said X conductors, each of said X conductors being effective when energized to cause the cores through which it is strung to switch from a first stable state to a second stable state, a discrete output winding strung through each of said cores, a common readout-reset winding serially strung through all of said cores, means responsive only to signals developed in said output windings when cores in said second stable state change back to said first stable state in response to the energization of said readout-reset winding, and means responsive to the energization of any one of said X conductors for effecting the energization of said readout-reset winding after a predetermined time delay.

References Cited in the file of this patent

UNITED STATES PATENTS

| | | |
|---|---|---|
| 2,562,530 | Dickinson | July 31, 1951 |
| 2,733,860 | Rajchman | Feb. 7, 1956 |
| 2,734,182 | Rajchman | Feb. 7, 1956 |
| 2,750,580 | Rabenda et al. | June 12, 1956 |
| 2,772,357 | An Wang | Nov. 27, 1956 |
| 2,820,956 | Rueger | Jan. 21, 1958 |
| 2,843,838 | Abbott | July 15, 1958 |
| 2,846,671 | Yetter | Aug. 5, 1958 |
| 2,884,622 | Rajchman | Apr. 28, 1959 |
| 2,905,934 | Flint | Sept. 22, 1959 |
| 2,912,679 | Bonorden | Nov. 10, 1959 |
| 2,953,778 | Anderson et al. | Sept. 20, 1960 |